(12) United States Patent
Moriya

(10) Patent No.: US 6,345,298 B1
(45) Date of Patent: Feb. 5, 2002

(54) SYSTEM FOR TRANSFERRING INFORMATION BETWEEN A SERVER AND A DATA TERMINAL THROUGH A NETWORK

(75) Inventor: Koji Moriya, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/609,836

(22) Filed: Jul. 5, 2000

Related U.S. Application Data

(62) Division of application No. 08/940,226, filed on Sep. 30, 1997.

(30) Foreign Application Priority Data

Sep. 30, 1996 (JP) .............................................. 8-276935

(51) Int. Cl.⁷ .............................................. G06F 15/16
(52) U.S. Cl. ...................... 709/228; 709/237; 709/246
(58) Field of Search ................................ 709/228, 237, 709/245, 246

(56) References Cited

U.S. PATENT DOCUMENTS

| | | | | |
|---|---|---|---|---|
| 5,633,923 A | * | 5/1997 | Kovarik | 379/200.76 |
| 5,673,322 A | * | 9/1997 | Pepe et al. | 380/49 |
| 5,684,988 A | * | 11/1997 | Pitchaikani et al. | 395/615 |
| 5,727,159 A | * | 3/1998 | Kikinis | 395/200.76 |
| 5,742,905 A | * | 4/1998 | Pepe et al. | 455/461 |
| 5,758,088 A | * | 5/1998 | Bezaire et al. | 395/200.62 |
| 5,790,785 A | * | 8/1998 | Klug et al. | 395/188.01 |
| 6,076,109 A | * | 6/2000 | Kikinis | 709/228 |

OTHER PUBLICATIONS

Schilit et al, TeleWeb: Loosely Connected Access to the World Wide Web, Fifth International World Wide Web Conference.*

* cited by examiner

Primary Examiner—Glenton B. Burgess
Assistant Examiner—Kenneth W. Fields
(74) Attorney, Agent, or Firm—Pennie & Edmonds LLP

(57) ABSTRACT

An information transfer system which includes a data terminal capable of connecting to networks and a central facility capable of connecting to a plurality of the data terminals which may differ from each other in their capabilities and/or features through the network. The data terminal has a model code which indicates its capabilities and/or features and sends the model code to the central facility at every time the data terminal connects to the central facility. The central facility discriminates the model code sent from the data terminal and detects the capabilities and/or the features of the data terminal. Further, the central facility sends information to the data terminal in a manner appropriate to the capabilities and/or features of the data terminal.

3 Claims, 14 Drawing Sheets

| | MODEL CODE | CAPABILITY OF DISPLAY | DISPLAY SIZE | CODE SCHEME | MEMORY CAPACITY |
|---|---|---|---|---|---|
| PERSONAL DIGITAL PHONE | A1 | MONOCHROME 2bits | 1/8 V G A | ORIGINAL | 64 KB |
| PDA1 | B1 | MONOCHROME 2bits | 1/8 V G A | SHIFT JIS | 128 KB |
| PDA2 | B2 | MONOCHROME 4bits | 1/4 V G A | SHIFT JIS | 512 KB |
| PDA3 | B3 | COLOR 8bits | 400×200 | ASCII | 1MB |
| PC1 | C1 | COLOR 16bits | VGA | SHIFT JIS | 100MB |

FIG.4

DATABASE OF MEMBERS
| NAME | ID | PASSWORD | E-MAIL ADDRESS | URL |
|---|---|---|---|---|
| | | | | |
| John Smith | KJMG01231 | GGSS7410 | John @ mail.com | http://www.mm.xx.zz/aa/ |
| | | | | |
FIG.5
MAIL BOX
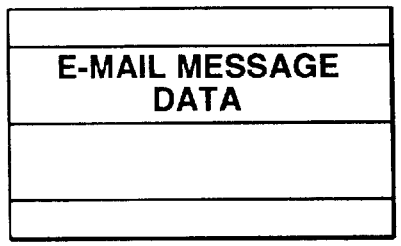
FIG.6
WEB PAGE DATA
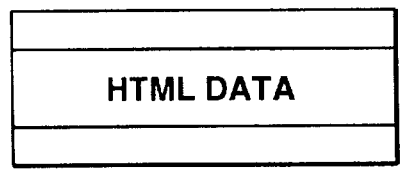
FIG.7

DATABASE OF DOCUMENTS

| | DOCUMENT 1 FOR PC | DOCUMENT 2 FOR PDA |
|---|---|---|
| NEWS / NEWS ITEMS | NEWS ARTICLES | NEWS ARTICLES |
| GUIDE TO RESTAURANTS / CATEGORIES AND NAMES OF RESTAURANTS | ARTICLES OF RESTAURANTS | ARTICLES OF RESTAURANTS |

FIG. 8

| SELECT AN APPROPRIATE NUMBER | | | |
|---|---|---|---|
| ···· DISPLAY SIZE | | | |
| 1. VGA | 2. 1/4 VGA | 3. 1/8 VGA | 4. 00×00 |
| ···· COLOR/MONOCHROME | | | |
| 1. 16 bits | 2. 8 bits | 3. MONOCHROME 4 bits | 4. MONOCHROME 2 bits |
| ···· CODE SCHEME | | | |
| 1. SHIFT JIS | 2. ASCII | 3. ORIGINAL | |

|  | ELECTRONIC DIARY | PERSONAL DIGITAL PHONE WITH DISPLAY | TELEPHONE WITH MULTI-FUNCTION | WORD PROCESSOR | PC |
|---|---|---|---|---|---|
| MODEL CODE | C12C4SX09K6 | C14C8D09K9 | C22C4AYD9JL | C28CGSYBJ34 | X2FVGSTAL54 |
| CAPABILITY OF DISPLAY | MONOCHROME 2 bits | MONOCHROME 4 bits | FOUR COLORS 2 bits | 8 bits COLOR | 16 bits COLOR |
| DISPLAY SIZE | 1/4 VGA | 1/8 VGA | 1/4 VGA | CGA | VGA |
| CODE SCHEME | SHIFT JIS | ORIGINAL 5 | ASCII | SHIFT JIS | SHIFT JIS |
| COMMUNICATION PROTOCOL | x-modem | ORIGINAL 2 | x-,y-modem | x-,y-modem | TCP/IP |
| FORMAT OF STILL IMAGE | BMP | BMP | BMP | BMP,JIF | ALL |
| CAPACITY OF MEMORY | 64 KB | 512 KB | 64KB+FLASH 1MB | HDD 340MB | HDD 540MB |

FIG.17

SYSTEM FOR TRANSFERRING INFORMATION BETWEEN A SERVER AND A DATA TERMINAL THROUGH A NETWORK

This is a division, of application Ser. No. 08/940,226, filed Sep. 30, 1997.

BACKGROUND OF THE INVENTION

1. Field of the Invention

The present invention relates to a system for transferring information to data terminals via networks, and more particularly to a network system having a server capable of transferring information to various data terminals which are different in capabilities or features from each other, in a manner appropriate to each data terminal.

2. Description of the Prior Art

In a network system with a client-server architecture, a plurality of client data terminals generally connect via networks to one or more servers which may be in a central facility of a network organization, such as an Internet service provider. The network organization is thus able to supply services to the data terminals via the networks.

In a conventional network system, most data terminals are stand-alone personal computers ("PCs") capable of communicating over the network. Each PC is enabled to receive information from the server by running programs capable of communicating with the server. In the case of the World Wide Web, for example, once the PC is provided with a Web browser program that can communicate with the server, the PC can always scan, receive and display hypertext markup language (HTML) documents from the World Wide Web via the networks.

Recently, small, and relatively simple (compared to the PC) data terminals have come into use as the client component in network environments. Such terminals include electronic diaries, personal digital assistants ("PDA") and the like. These data terminals often employ a different visual user-interface having e.g. a different display size, a different number of colors to be displayed and the like, than the PC due to their reduced size and/or lower manufacturing cost. These data terminals, however, pose a problem in that they are not able to represent completely the information to be displayed because the information on the server is generally prepared for terminals with all the capabilities of the PC.

SUMMARY OF THE INVENTION

Therefore, it is an object of the invention to provide a network system, a server and a data terminal permitting supply of more complete information to diverse types of data terminals that may be less capable of receiving the information than the usual PC.

In order to achieve this and other objectives, the present invention provides an information transfer system using a network comprising a data terminal connected to the network and a central facility capable of connecting to a plurality of the data terminals which terminals may differ from each other in their capabilities. The data terminal includes code storing means for storing a code indicating the capability of the data terminal, and code transfer means for transferring the code stored in the code storing means to the network. The central facility advantageously includes code receiving means for receiving the code which is transferred from the data terminal through the network, discrimination means for discriminating the code received by the code receiving means and for detecting the capabilities of each data terminal, and information transfer means for transferring information to the data terminal in a manner appropriate to the terminal's capability.

The present invention also provides a server capable of connecting a plurality of data terminals which may differ from each other in their capabilities and of transferring information to the data terminals using a network. This server advantageously comprises discrimination means for discriminating the capability of the data terminal which connects to the network, and information transfer means for transferring the information to the data terminal in an appropriate manner to the capability of the data terminal discriminated by the discrimination means.

The present invention also provides a data terminal capable of connecting to a network system including a server capable of connecting to a plurality of the data terminals, which terminals may differ from each other in their capability and of transferring information to the data terminals using a network. The data terminal advantageously comprises code transfer means for transferring a code which can discriminate the capability of the data terminal by the server to the server when the data terminal connects to the server.

BRIEF DESCRIPTION OF THE DRAWINGS

FIG. 4. is a diagram illustrating a table stored in the code storage section 21 shown in FIG. 1.

FIG. 5 is a diagram illustrating a database of members stored in the data storage section 231 shown in FIG. 1.

FIG. 6 is a diagram illustrating a mail box in the data storage section 231 shown in FIG. 1.

FIG. 7 is a diagram illustrating a web page data stored in the data storage section 231 shown in FIG. 1.

FIG. 8 is a diagram illustrating a database of documents stored in the data storage section 231 shown in FIG. 1.

FIG. 17 is a diagram illustrating the table stored in the model code decode section 25 shown in FIG. 15.

DETAILED DESCRIPTION OF THE PREFERRED EMBODIMENTS OF THE INVENTION

Figure 1:
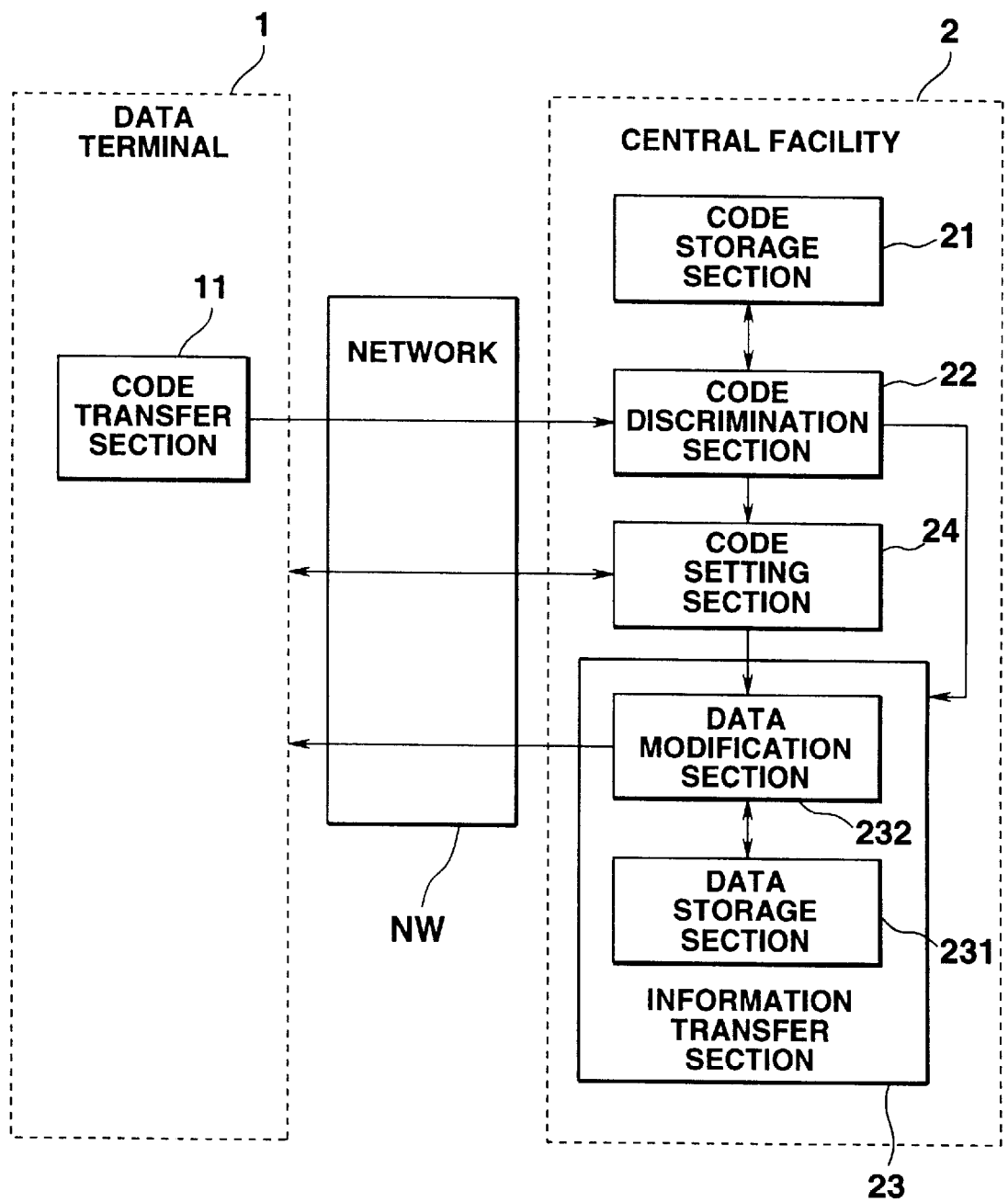
FIG. 1 is a block diagram showing an architecture of a network system employing the present invention.

FIG. 1 shows an architecture of a network system employing the present invention, The network system comprises a data terminal 1 and a central facility 2 which are connected each other through a network NW. The data terminal 1 may be a personal digital phone (either with or without data capability), a PDA, a PC or any other terminal type provided with a code transfer section 11. The code transfer section 11 may include a part of a program which enables the data terminal 1 to communicate with the central facility 2 and a part of the hardware of the data terminal 1, such as a memory. The code transfer section 11 stores a model code which is determined by the central facility 2 based on capabilities and features of the data terminal 1 in the first communication process between the data terminal and the central facility 2 which will be described later, and sends the model code to the central facility 2 at every time the data terminal 1 commences communicating to the central terminal 2.

The facility 2 may be implemented by a network service provider which supplies information services using networks and can be connected to a plurality of data terminals 1, each of which may differ from others in its capabilities and/or features. The facility 2 has a code storage section 21, a code discrimination section 22, a information transfer section 23 and a code setting section 24. The code storage section 21 may include a relational database, such as a table, and stores model codes which are determined based on the capabilities and features of the different data terminals 1 to be served, together with related data on the capabilities and feartures of each model code. The code discrimination section 22 detects the model code sent from the data terminal 1 when it connects to the central facility 2 and obtains the specification data describing the capabilities and features corresponding to the specific model code from the data storage section 21. Further, the code discrimination section 22 supplies the specification data obtained from the code storage section 21 to the information transfer section 23. When the code discrimination section 22 detects an unregistered code, the code setting section 24 performs an operation for assigning the specific model code to the data terminal 1. The code setting section 23 may include programs. The code setting section 23 obtains data on the capabilities and features of the data terminal 1 from the data terminal 1 and seeks out an appropriate model code stored in the code storage section 21 based on the data of the capabilities and features. The code setting section 24 sends the specific model code to the data terminal 1. The information transfer section 23 has a data storage section 231 and a data modification section 232 and transfers information to the data terminal 1 in the manner appropriate to the capabilities and features indicated by the specification data supplied from the code discrimination section 22. The data storage section 231 stores various documents for supplying to the data terminal 1. Such documents may include HTML documents, e-mail messages and other documents with respect to characters, graphics or sounds. The data modification section 232 modifies or selects the documents stored in the data storage section 231 according to the specification data supplied from the code discrimination section 22 and sends the modified or selected documents to the data terminal 1. The modifications or selections permit the documents sent to each data terminal 1 to appear in the desired form consistent with the characteristic of that particular terminal type. For example, when the data terminal 1 uses different code scheme from the documents stored on the data storage section 231, the data modification section 232 modifies the code scheme of the documents into appropriate code scheme to the data terminal 1. When the data terminal has a display which is not capable of displaying image data, the data modification section 232 deletes image data from the documents to be sent.

Figure 2:
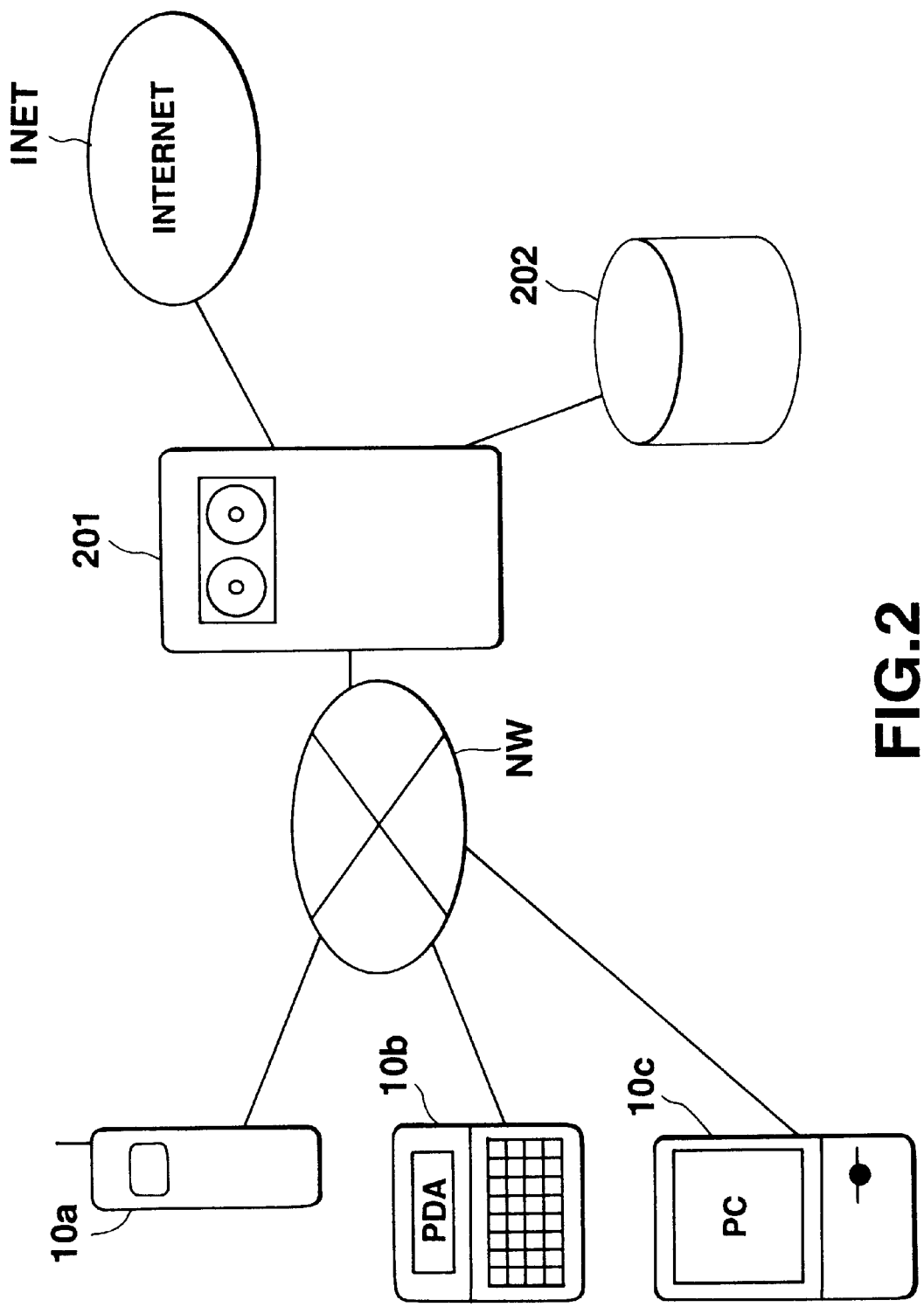
FIG. 2 is a block diagram showing specific different types of data terminal 1 and central facility 2 connected to the network system shown in FIG. 1.

FIG. 2 shows specific different types of data terminal and central facility connected to the network system shown in FIG. 1. A personal digital phone 10a, a PDA 10b and a PC 10c in FIG. 2 are the data terminal 1 in FIG. 1. A standard telephone network NW in FIG. 2 is the network NW in FIG. 1. A server 201 and an information storage section 202 in FIG. 2 are included in the central facilities 2 in FIG. 1.

In this embodiment, the server 201 performs several functions, such as an authorizing system, a World Wide Web server, a news server, a mail server and a levy system, and connects an Internet INET through a private wire.

The personal digital phone 10a, the PDA 10b and the PC 10c connect to the standard telephone network NW through a modulation/demodulation apparatus, such as a modem (modulator/demodulator). The central facility 2 supplies services, such as a Internet service, news service and a e-mail service, to the personal digital phone 10a, the PDA 10b and the PC 10c. The news service includes information with respect to restaurants, concerts, movies and the like as well as news.

The information storage section 202 stores a plurality of databases which are necessary to supply the information services to the data terminals 1.

Figure 3:
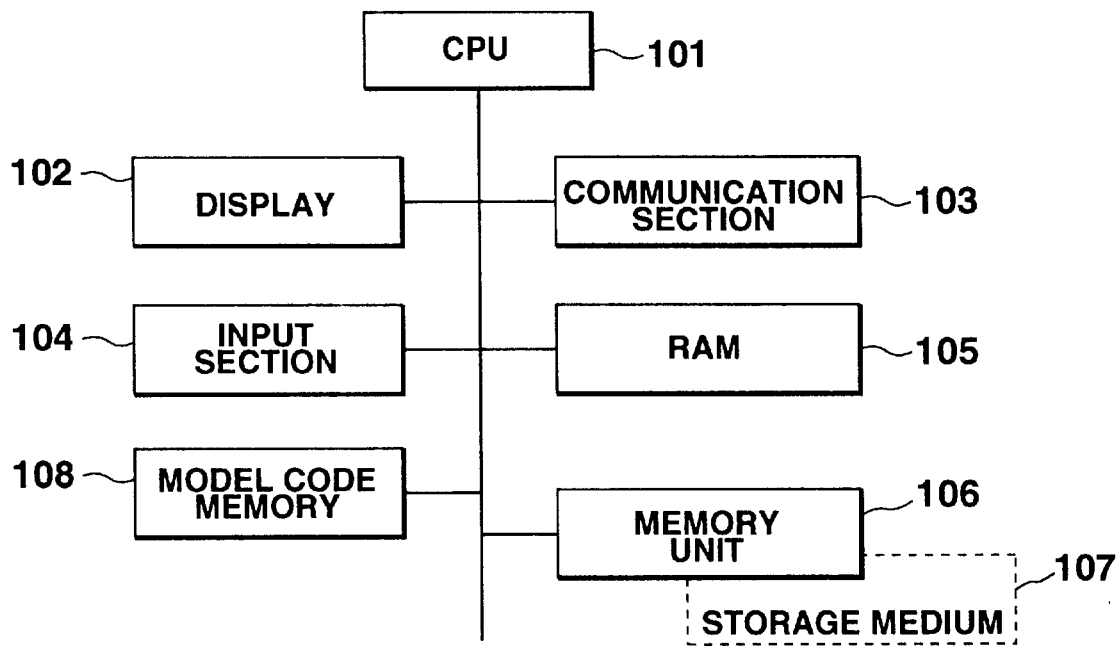
FIG. 3 is a block diagram of the data terminal 1 shown in FIG. 1.

FIG. 3 shows a basic block diagram of the data terminal 1 which may be the personal digital phone 10a, the PDA 10b and the PC 10c. The data terminals 1 include a CPU (central processing unit) 101, a display 102, a communication section 103, and input section 104 and RAM (random access memory) 105, a memory unit 106 and a model code memory 108. The display 102 may consist of an LCD (liquid crystal display) in a portable type of the data terminal 1, such as the personal digital phone 10a and the PDA 10b. In the PC 10c, the display 102 may be a CRT (cathode ray tube) or an LCD. The communication section 103 may be a modem and controls connection to the network NW. The input section 104 may be a keyboard, but some other input sections 104 may include a mouse and/or a touch panel. The RAM 10 is used as a work area by the CPU 101. The memory unit 106 stores software including an OS (operating system), applicaiton programs, databases and a communication program which enables the data terminal 1 to communicate with the central facility 2 via the network NW. The memory unit 106 includes a sotrage medium 107 which generally may be a hard disk in the PC 12c, or an ROM and an RAM in the personal digital phone 10a and the PDA 10b. In addition, the storage medium 107 may also be a CD-ROM, a magneto-optical disk or other media for storing programs, and may be either united with or detachable from the memory unit 106. The programs stored in the storage medium 107 may be obtained from other systems via the network NW. The model code memory 108 stores the model code which is assigned by the central facility 2 based on the capabilities and features of the data terminal 1. The model code memory 108 may be a part of the memory unit 106.

The contents of the relational database stored in the code storage section 21 in the central facility 2 shown in FIG. 1 will be described as follows.

For the sake of explanation, it is understood that there are five types of the data terminals 1 to be connected to the central facility 2. The code storage section 21 stores the relational database shown in FIG. 4. The relational database includes the model codes and the specification data which describes the capabilities and features of the data terminals 1 corresponding to each model code.

The relational database indicates that (1) a personal digital phone classified by the model code "A1" has a 2 bits-monochrome display as a capability of a display, a ⅛ VGA (video graphic adapter) as a display size, a custom code scheme and 64K-bytes of memory capacity; (2) a PDA 1 classified by the model code "B1" has a 2 bits-monochrome display as a capability of a display, a ⅛ VGA as a display size, a Shift JIS (Japanese Industrial Standard) code scheme and 128K-bytes of memory capacity; (3) a PDA 2 classified by the model code "B2" has a 4 bit-monochrome display as a capability of a display, a ¼ VGA as a display size, a Shift JIS code scheme and 512K-bytes of memory capacity; (4) a PDA 3 classified by the model code "B3" has a 8 bits-color display as a capability of a display, 400×200 dots as a display size, an ASCII code scheme and 1M bytes of memory capacity; and (5) a PC 1 classified by the model code "C1" has a 16 bit-color display as a capability of a display, a VGA as a display size, a Shift JIS code scheme and 100M bytes of memory capacity.

The data storage section 231 shown in FIG. 1 stores a database of members to be supplied services by the network service provider. As shown in FIG. 5, the database of the members includes data which indicate a name, an ID, a password, an e-mail address and a URL (uniform resource locator) for addressing to World Wide Web page with respect to each member. The data storage section 231 also has a mail box for storing e-mail message data and a storage area for storing Web page data which are prepared by a member, as shown FIGS. 6 and 7. That is, the data storage section 231 stores the data which is necessary to supply an e-mail service and a Web site creating service to the members. The data storage section 231 also stores a database of documents with respect to news and a guide of restaurants in order to supply news information service and restaurant information service as shown in FIG. 8. The database shown in FIG. 8 includes two kinds of documents, each kind of which substantially describes the same contents of news articles and articles of restaurant, but which are different from each other in format. One of them is for a PC and another is for a PDA. The document 1 for a PC includes character data and image data in color. The document 2 for a PDA includes character data and image data in gray-scale monochrome.

The operation of the network system set forth above will be explained referring to FIGS. 9A and 9b as follows.

Figure 9A:
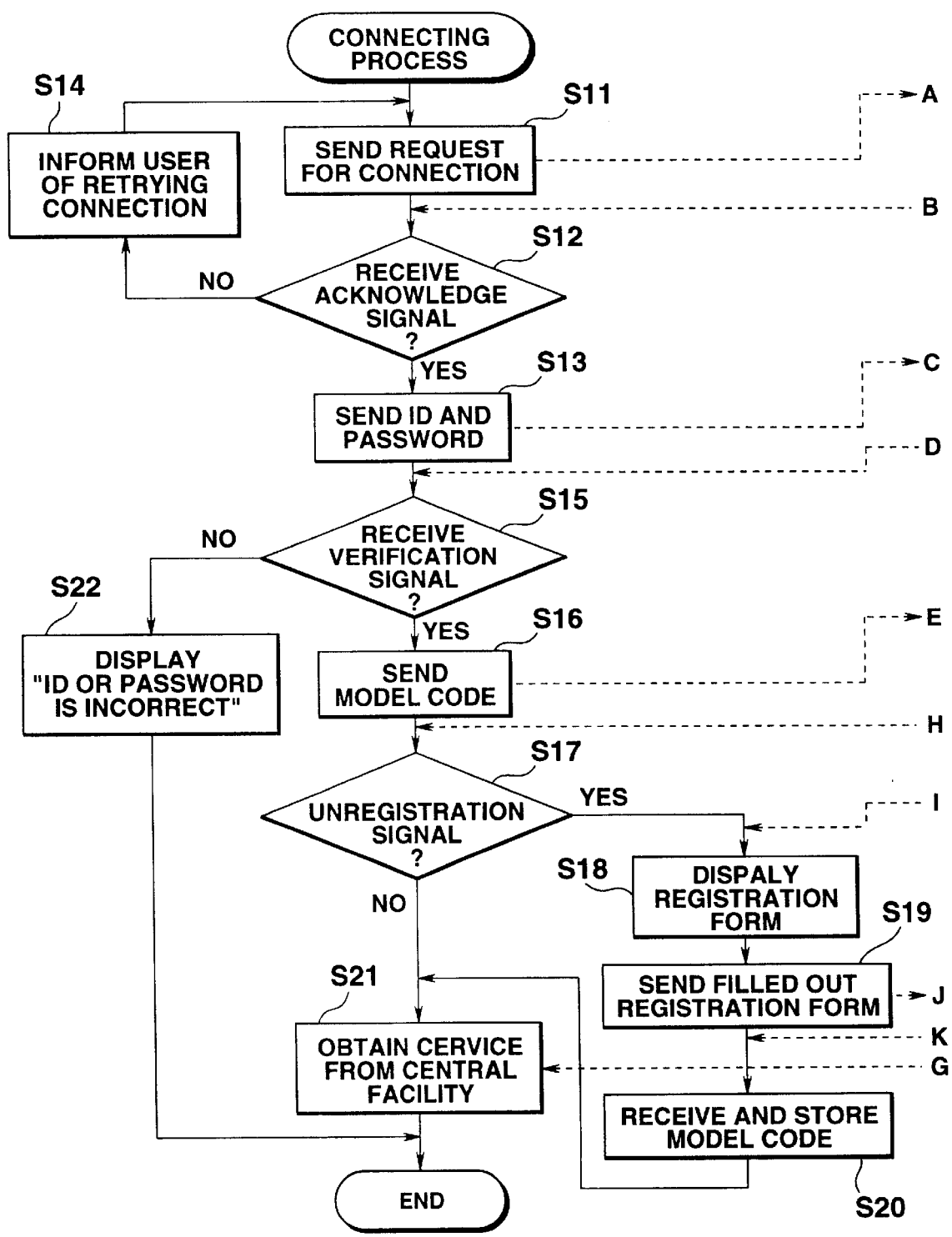
FIG. 9A is a flow chart illustrating the operation of the data terminal 1 shown FIG. 1 with respect to a connecting process to the central facility 2.

FIG. 9A shows the operation of the connecting process performed by the data terminal 1. FIG. 9B shows the operation of the model code discriminating process performed by the central facility 2.

The data terminal 1 and the central facility 2 start performing the processes shown in FIGS. 9A an 9B respectively when the data terminal 1 gains dial-up access to the central facility 2 through the network NW. First, the data terminal 1 sends a request signal A for connection to the central facility 2 (Step S11 in FIG. 9A). The central facility 2 verifies receipt of the request signal A for the connection from the data terminal 1 (Step S31 in FIG. 9B), and sends an acknowledge signal B back to the data terminal 1 (Step S32 in FIG. 9B). In Steps S31 and S32 in FIG. 9B, the central facility 2 does not send the acknowledge signal B until the central facility 2 verifies the receipt of the request signal A for the connection from the data terminal 1. Therefore, when the data terminal 1 has not received the acknowledge signal from the central facility 2 for a predetermined time, the data terminal 1 informs a user of retrying to connect to the central facility 2 by the display (Step S14 in FIG. 9A). The data terminal 1 retries to connect to the central facility 2 and sends the request for the connection to the central facility 2 again (Step S11 in FIG. 9A) unless the user refuses to retry to connect to the central facility 2. When the data terminal 1 receives the acknowledge signal B from the central facility 2 (Step S12 in FIG. 9A), the data terminal 1 sends an ID and a password C which are input by the user to the central facility 2 (Step S13 in FIG. 9B). The central facility 2 verifies the ID and the password C (Step S33 in FIG. 9B) and sends either a verification signal D when both the ID and the password C are verified (Step S34 in FIG. 9B) or an invalid signal D when at least one of the ID and the password C is incorrect (Step S45 in FIG. 9B). When the data terminal 1 receives the invalid signal from the central terminal 2 (Step S15 in FIG. 9A), the data terminal 1 displays "ID or password is incorrect" (Step S22 in FIG. 9A) and terminates the connecting process. When the data terminal 1 receives the verification signal D from the central facility 2, the code transfer section 11 of the data terminal 1 sends the model code E to the central facility 2 (Step S16 in FIG. 9A). In the Step S16 in FIG. 9A, when the data terminal 1 has not been registered, the code transfer section 11 sends the central facility 2 an unregistered code E, such as "FFFFh", which is predetermined by the program for communicating with the central facility 2. When the code discrimination section 22 of the central facility 2 discriminates the unregistered code E sent from the data terminal 1 (Step S35 in FIG. 9B), the code setting section 24 of the central facility 2 sends an unregistration signal H and a registration form I which will set forth later to the data terminal 1 (Steps S36 and S37 in FIG. 9B). When the data terminal 1 receives the unregistration signal H and the registration form I from the central facility 2 (Step S17 in FIG. 9A), the data terminal 1 displays a registration form I sent from the central facility 2 as shown in FIG. 10 (Step S18 in FIG. 9A) and starts performing a utility program, such as a wizard, which guides the user to fill out the registration form I. When the user fills out the registration form I and instructs the data terminal 1 to send it, the data terminal 1 sends file J of the registration form I which has been filled out by the user to the central terminal 2 (Step S19 in FIG. 9A). The code setting section 24 checks over file J of the filled out registration form for mistakes (Step S38 in FIG. 9B). If file J of the filled out registration form is not complete, the code setting section 24 repeats performing the operation of Steps S36–S38. When file J of the filled out registration form is complete, the code setting section 24 performs the operation for comparing the contents of file J of the filled out registration form with the specification data stored in the code storage section 21, and detects the closest specification data stored in the code storage section 21 (Step S39 in FIG. 9B) to the contents of file J. Thereafter, the central facility 2 transfers the specific model code K which corresponds to the closest specification data stored in the code storage section 21 to the data terminal 1 (Step S40 in FIG. 9A). When the data terminal 1 receives a specific model code K from the central facility 2, the code transfer section 11 of the data terminal 1 stores the specific model code K (Step S20 in FIG. 9A) so that the data terminal 1 will send the specific model code to the central facility 2 at and after the next connection to the central facility 2. By these processes of Steps S18–20 in FIG. 9A and Steps S36–S40 in FIG. 9B, the data terminal 1 is registered and is enabled to obtain the information services from the central facility 2 (Step S21 in FIG. 9A). When the data terminal has already been registered, the data terminal 1 is immediately enabled to obtain the information services from the central facility 2 (Step S21 in FIG. 9A) without receiving the unregistration signal (Step S17 in FIG. 9A).

Figure 9B:
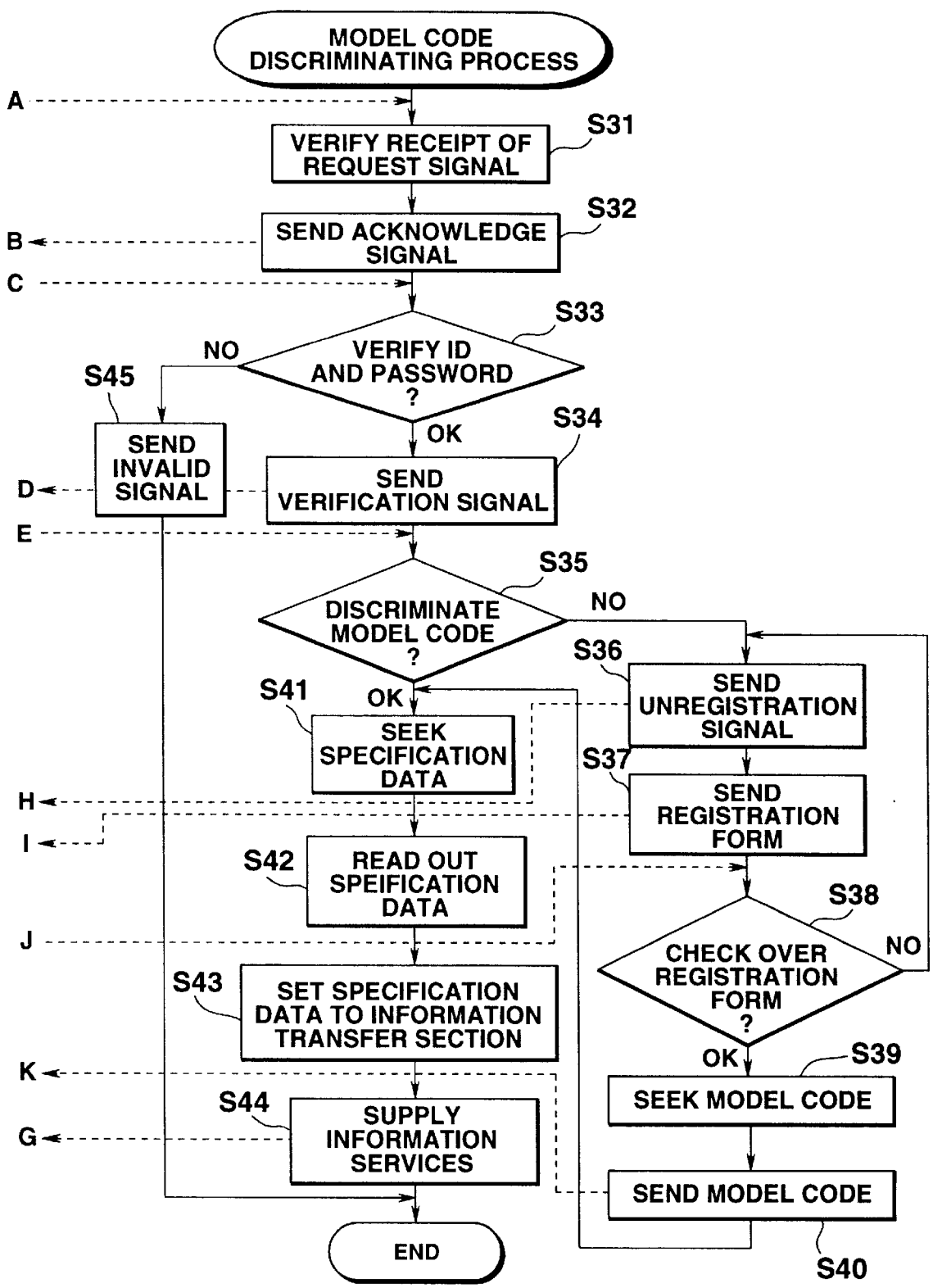
FIG. 9B is a flow chart illustrating the operation of the central facility 2 shown in FIG. 1 with respect to a model code discrimination process.
Figures 10, 16:
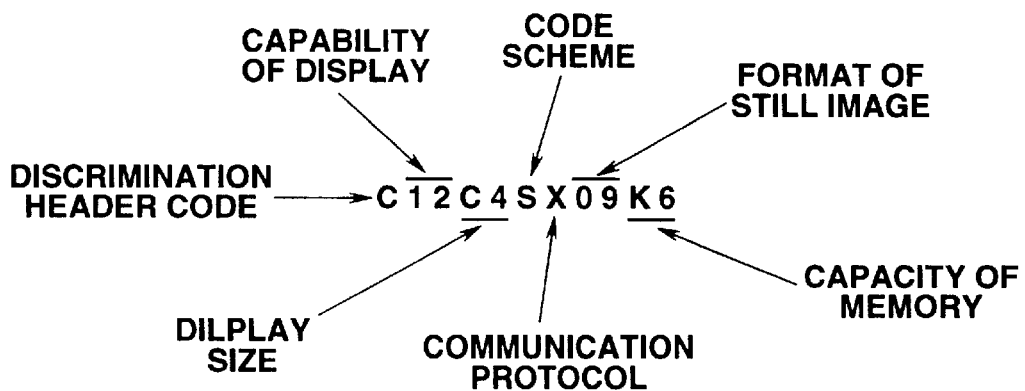
FIG. 10 is a diagram illustrating a display of the data terminal 1 shown in FIG. 1 when the data terminal receives a registration form.
FIG. 16 is a diagram illustrating the structure of the model code in the second embodiment of the present invention.

After central facility 2 sends the specific model code K to the data terminal (Step S40 in FIG. 9B) or receives the specific model code E from the registered data terminal 1 (Step S35 in FIG. 9B), the code discrimination section 22 of the central facility 2 seeks through the code storage section 21 of the central facility 2 (Step S41 in FIG. 9B) and reads out the specification data corresponding to the specific model code from the code storage section 21 (Step S42 in FIG. 9B). Further, the code discrimination section 22 supplies the specification data to the data modification section 232 in the information transfer section 23 (Step S43 in FIG. 9B) so that the data modification section 232 modifies or selects document stored in the data storage section 231 based on the specification data. Thereafter, the central facility 2 starts supplying the information services to the data terminal 1 using the modified or selected documents (Step S44 in FIG. 9B).

The information services which the central facility 2 supplies to the data terminals 1 will be set forth as follows.

The information services to be supplied differ depending on the type of the data terminal 1 as Table 1, because the capabilities and the features of each data terminal 1 differ.

Figure 11:
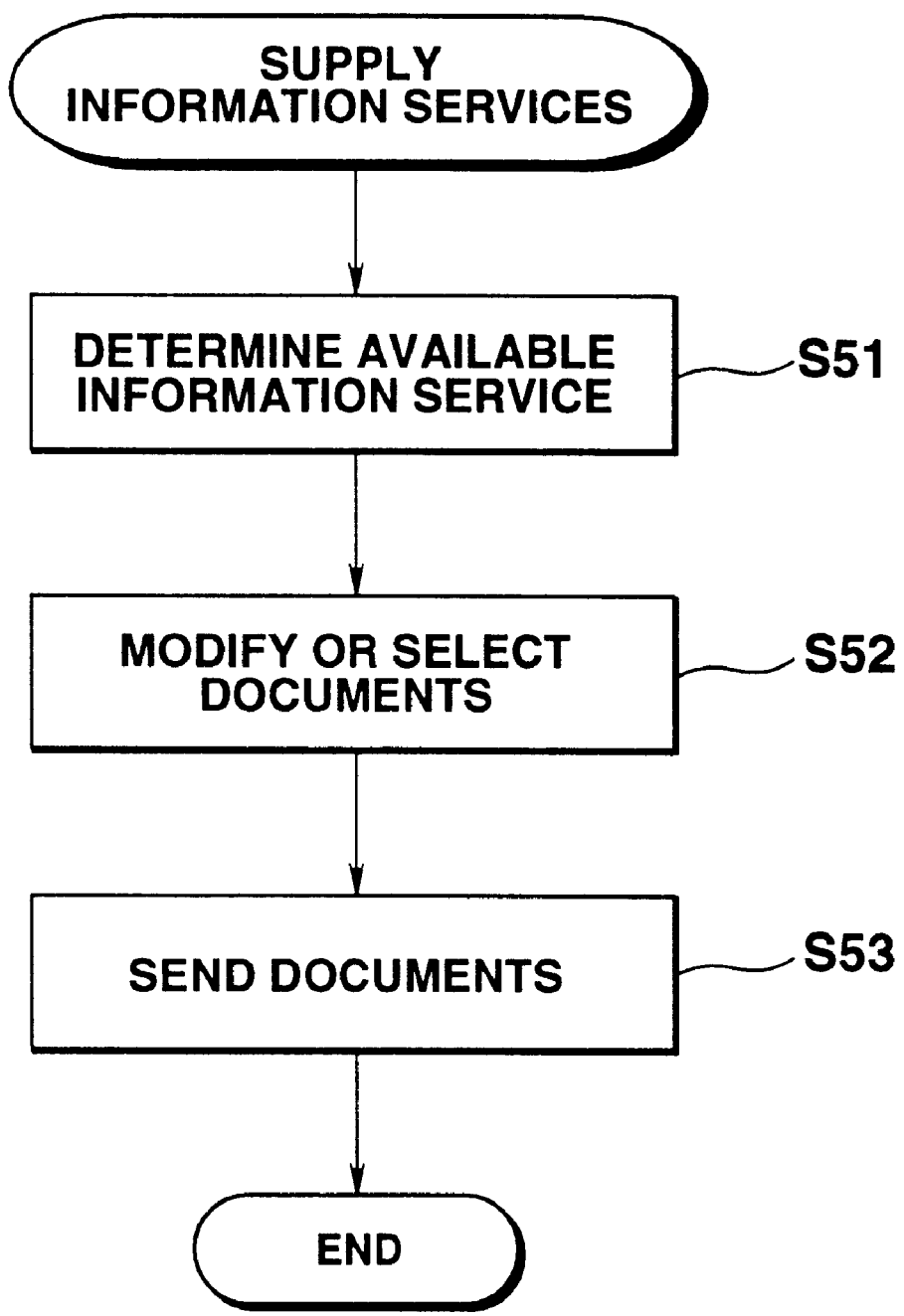
FIG. 11 is a flow chart illustrating the basic operation of the central facility 2 shown in FIG. 1 with respect to supplying the information services.

The basic operation of supplying the information services by the central facility 2 is shown in FIG. 11. The central facility 2 determines information services to be supplied to the data terminal 1 based on the model code sent from the data terminal 1 (Step S51), modifies or selects the documents to be sent to the data terminal 1 if necessary (Step S52), and sends the modified or selected documents to the data terminal 1 (Step S53).

TABLE 1

| | E-MAIL SERVICE | NEWS SERVICE | WEB SERVICE |
| --- | --- | --- | --- |
| PERSONAL DIGITAL PHONE | AVAILABLE | AVAILABLE | NOT AVAILABLE |
| PDA1 | AVAILABLE | AVAILABLE | NOT AVAILABLE |
| PDA2 | AVAILABLE | AVAILABLE | NOT AVAILABLE |
| PDA3 | AVAILABLE | AVAILABLE | AVAILABLE |
| PC1 | AVAILABLE | AVAILABLE | AVAILABLE |

Figure 12:
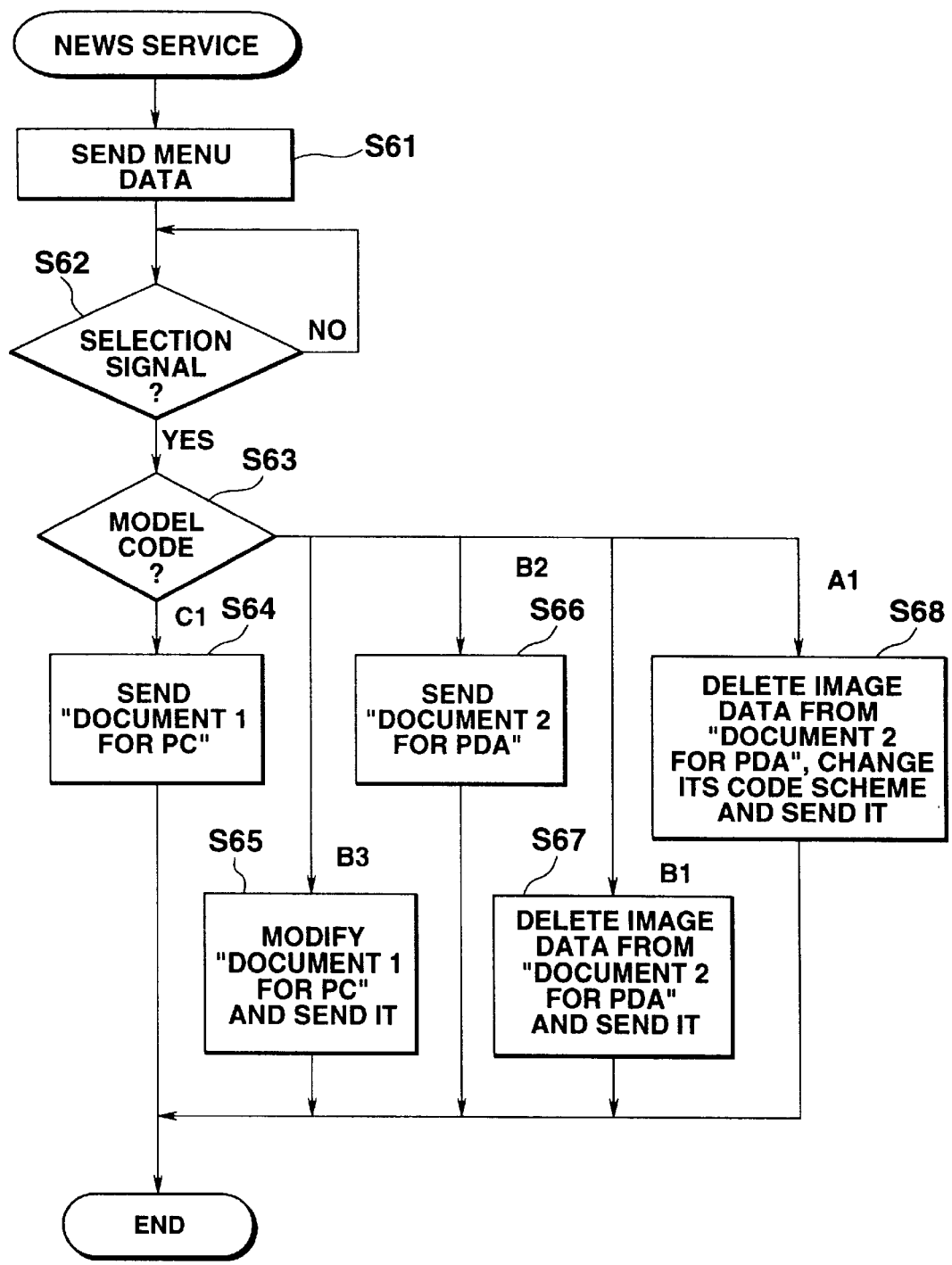
FIG. 12 is a flow chart illustrating the operation of the central facility 2 shown in FIG. 1 with respect to supplying the news services.

FIG. 12 shows the operation of supplying the news service by the central facility 2 in detail. First, the central facility 2 sends a menu data to the data terminal 1 (Step S61). The menu data is prepared based on the news items and the categories and names of the restaurants stored in the database of the documents shown in FIG. 8 and may be sent in the text format so that all of the data terminal 1 can display the menu data regardless of its capabilities and features.

Thus, the user of the data terminal 1 can select the specific information which s/he wants to see from the menu data. When the user of the data terminal 1 selects the specific information from the manu data, the central facility 2 detects a selection signal according to the user's selection from the data terminal 1 (Step S62). The information transfer section 23 detects the model code of the data terminal 1 to supply the specific information (Step S63) and sends the modified or selected documents to the data terminal 1 based on the model code which has been sent from the data terminal 1 and is stored in the data modification section 232 (Steps S64–S68). That is, when the model code is "C1" for the PC1 (shown in FIG. 4), the information transfer section 23 transfers the "DOCUMENT 1 for PC" (shown in FIG. 8) stored in the data storage section 231 to the data terminal 1 (Step S64). When the model code is "B3" for the PDA3 (shown in FIG. 4), the information transfer section 23 modifies the "DOCUMENT 1 for PC" (shown in FIG. 8) with respect to the capabilities of the display, the display size, and the code scheme, and sends the modified "DOCUMENT 1 for PC" (Step S65). When the model code is "B2" for the PDA2 (shown in FIG. 4), the information transfer section 23 transfers the "DOCUMENT 2 for PDA" (shown in FIG. 8) to the data terminal 1 (Step S66). When the model code is "B1 " for the PDA1 (shown in FIG. 4), the information transfer section 23 deletes image data from the "DOCUMENT 2 for PDA" (shown in FIG. 8), and sends it to the data terminal 1. When the model code is "A1" for the personal digital phone (shown in FIG. 4), the information transfer section 23 deletes the image data from the "DOCUMENT 2 for PDA", changes the code scheme into the custom code scheme and transfers it to the data terminal 1 (Step S68).

Figure 13:
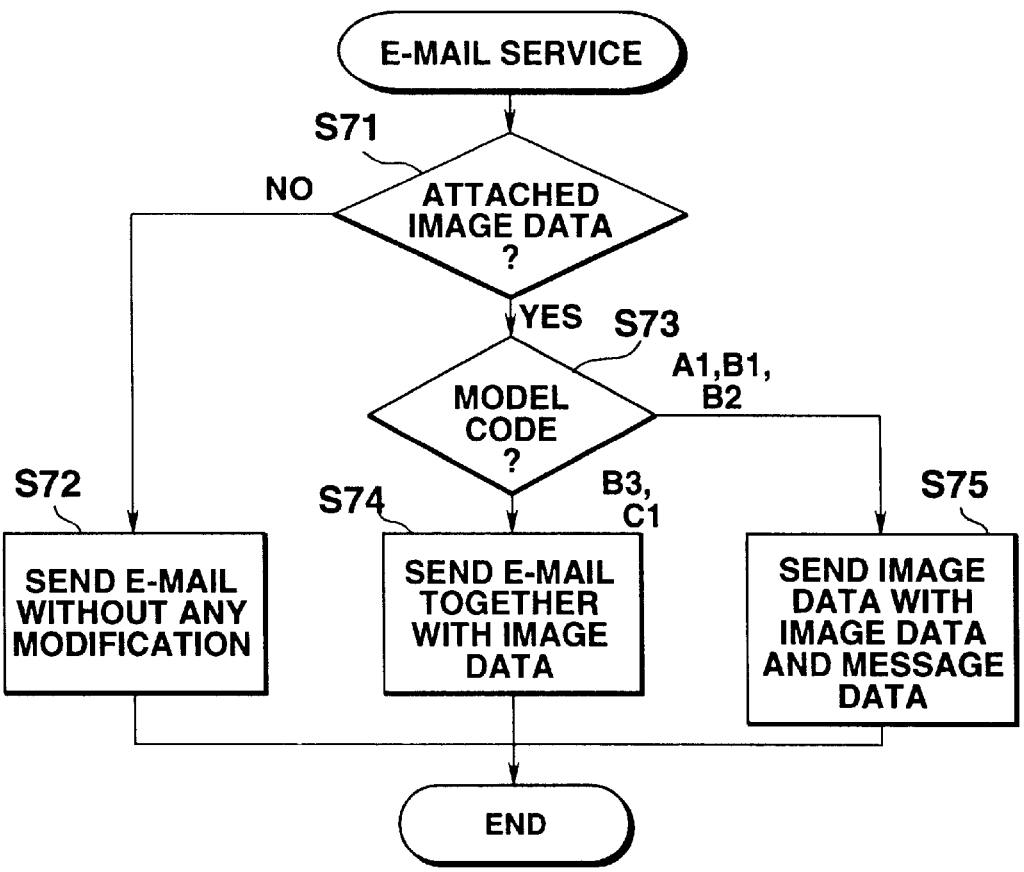
FIG. 13 is a flow chart illustrating the operation of the central facility 2 shown in FIG. 1 with respect to supplying the e-mail service.

The e-mail service which the central facility 2 supplies to the data terminal 1 is set forth as follows. The central facility 2 stores e-mails which are sent to the members in the mail box shown in FIG. 6. When the user requests to obtain the e-mails stored in the mail box, the central facility 2 starts the operation shown in FIG. 13. The central facility 2 detects whether or not the e-mail to be sent to the data terminal 1 is attached image data (Step S70). When the e-mail is not attached the image data, the information transfer section 23 send the e-mail without any modifications or changes (Step S72). When the e-mail is attached the image data, the information transfer section 23 detects the model code which has been sent from the data terminal 1 and is stored in the data modification section 232. When the model code is "B3" for the PDA 3 or "C1" for the PC1, the information transfer section 23 sends the e-mail together with the image data (Step S74). When the model code is "A1" for the personal digital phone, "B1" for the PDA 1 or "B2" for the PDA2, the information transfer section 23 sends the e-mail without the image data and message data which indicates that the e-mail is attached the image data but not send the image data (Step S75).

Figure 14:
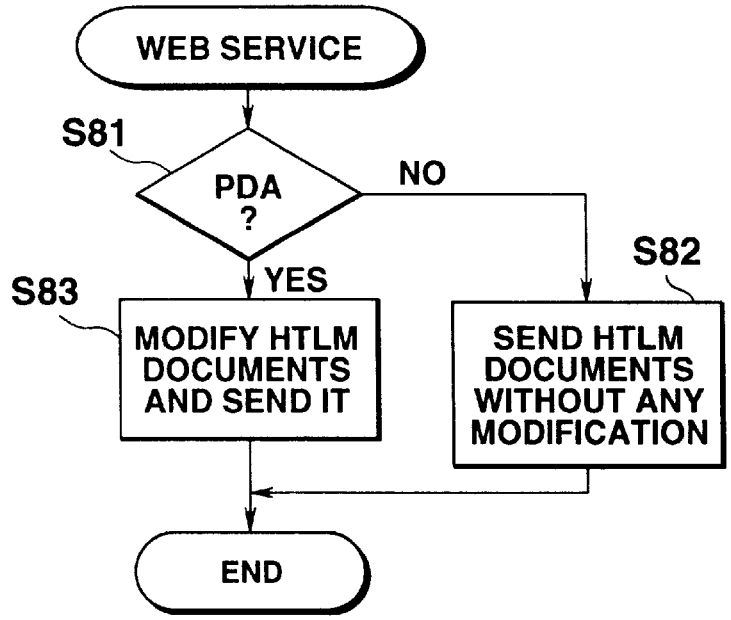
FIG. 14 is a flow chart illustrating the operation of the central facility 2 shown in FIG. 1 with respect to supplying the web service.

FIG. 14 shows the operation of the web service by the central facility 2. When the central facility 2 receives the URL from the data terminal 1, the information transfer section 23 detects whether or not the data terminal 1 is the PDA (Step S81). When the data terminal 1 is not the PDA, that is, the data terminal 1 is the PC since only the PC and the PDA3 is available to obtain the web service, the information transfer section 23 sends the HTML documents without any modification (Step S82). When the data terminal 1 is the PDA, the information transfer section 23 modifies the HTML documents with respect to the capabilities of the display, the display size and sends them.

The second embodiment of the invention will be described as follows.

Figure 15:
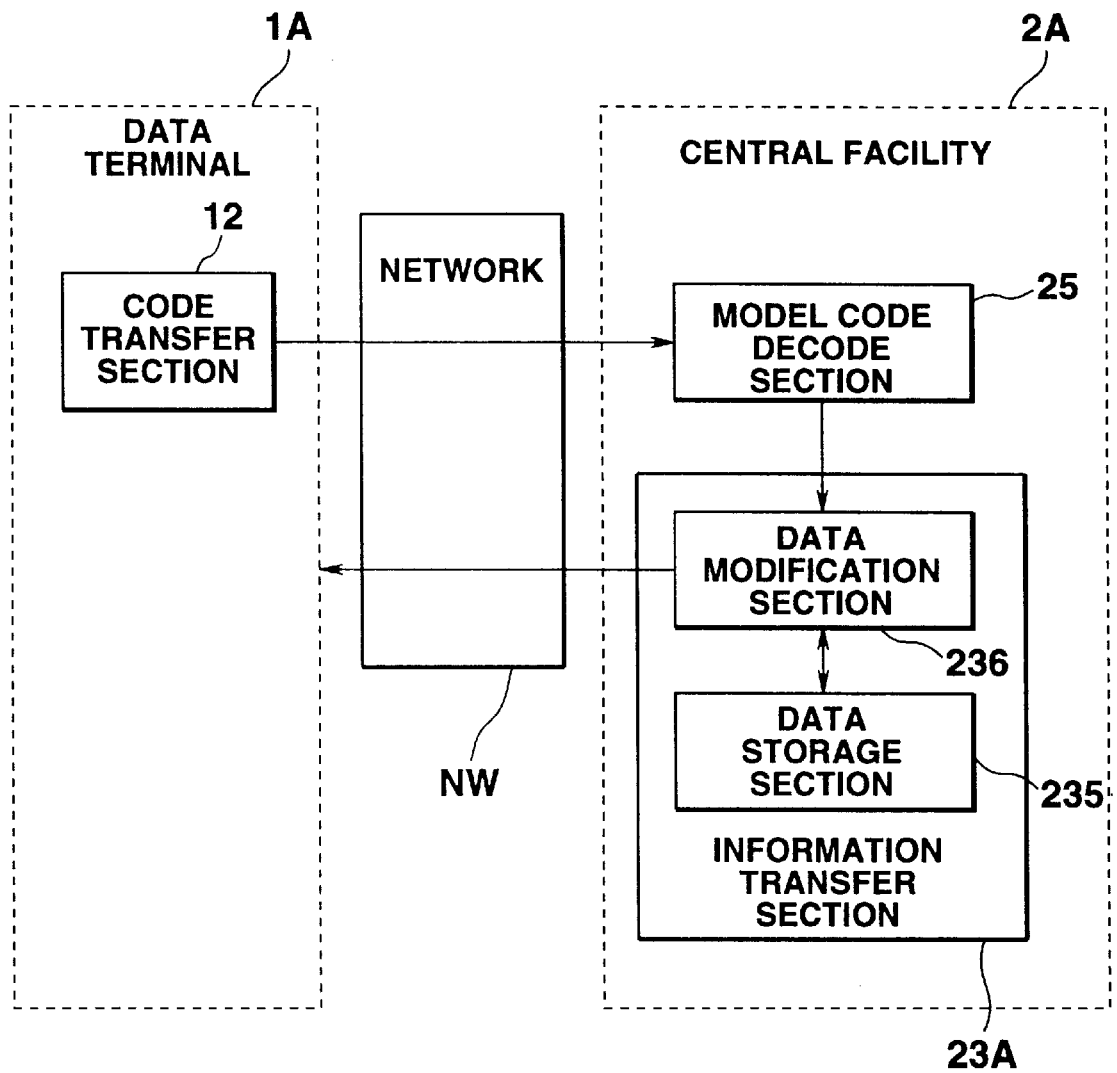
FIG. 15 is a block diagram showing an architecture of a network system, in the second embodiment of the present invention.

FIG. 15 shows a network system of the second embodiment of the invention. A data terminal 1A includes a code transfer section 12 which may include a part of a program which enables the data terminal 1A to communicate with a central facility 2A and a part of the hardware of the data terminal 1A. The code transfer section 12 prepares a model code based on the capabilities and features of the data terminal 1A which are input by the user of the data terminal 1A and sends the model code to the central facility 2A every time the data terminal 1A connects to the central facility 2A. FIG. 16 shows the model code which is prepared by the code transfer section 12. The model code includes a discrimination header code and function codes which indicate capabilities of the display, display size, code scheme, communication protocols, still image formats and memory capacity. The code transfer section 12 automatically prepares the model code based on an input data by the user.

The central facility 2A includes a model code decode section 25 and an information transfer section 23A. The model code decode section 25 decodes the model code sent from the data terminal 1A. That is, the model code decode section 25 prepares the specification data which indicates the capabilities and features of the data terminal 1A from the model code based on a table shown in FIG. 17. Thereafter, the model code decode section 25 supplies the specification data to a data modification section 236 of the information transfer section 23A. The data modification section 236 modifies or selects the information data stored in the data storage section 235.

What is claimed is:

1. A server for connecting via a network to a plurality of data terminals which may differ from each other in their capabilities and for transferring information to the data terminals though the network, said server comprising:

code storage means for storing at least one model code and capability data corresponding to the model code and describing the capabilities of a data terminal;

detection means for detecting whether a data terminal has been registered;

requesting means for requesting an unregistered data terminal to send data indicating its capabilities;

assigning means for comparing the capability data stored in said code storage means with the capabilities indicated by the data sent from the unregistered data terminal and assigning to the unregistered data terminal the model code corresponding most closely to the capabilities indicated by the data sent from the data terminal; and information transfer means for transferring information to a data terminal which has been registered in a manner determined by its model code.

2. A server according to claim 1, further comprising:

information storage means for storing plural pieces of information, all pieces having substantially the same content, but differing from each other in the format of that content;

wherein said information transfer means includes means for selecting at least one piece of information in the format that the data terminal is capable of handling based on the model code sent from the data terminal, and for transferring the selected piece of information to the data terminal.

3. A server according to claim 1, further comprising:

information storage means for storing information to be transferred to the data terminal;

wherein said information transfer means includes modification means for modifying the information stored in said information storage means based on the model code received from the data terminal.

* * * * *